(12) United States Patent
Cheng

(10) Patent No.: US 9,045,972 B2
(45) Date of Patent: *Jun. 2, 2015

(54) APPARATUSES AND METHODS FOR DETERMINING TEMPERATURE DATA OF A COMPONENT OF AN EARTH-BORING DRILLING TOOL

(71) Applicant: Baker Hughes Incorporated, Houston, TX (US)

(72) Inventor: Xiaomin C. Cheng, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/461,957

(22) Filed: Aug. 18, 2014

(65) Prior Publication Data

US 2014/0345948 A1    Nov. 27, 2014

Related U.S. Application Data

(63) Continuation of application No. 13/159,164, filed on Jun. 13, 2011, now Pat. No. 8,807,242.

(51) Int. Cl.
*E21B 47/06* (2012.01)
*E21B 12/02* (2006.01)
(Continued)

(52) U.S. Cl.
CPC .............. *E21B 47/065* (2013.01); *E21B 12/02* (2013.01); *G01K 11/24* (2013.01); *G10K 11/004* (2013.01); *E21B 10/62* (2013.01); *E21B 7/00* (2013.01)

(58) Field of Classification Search
CPC ....... E21B 47/00; E21B 10/36; E21B 47/011; E21B 10/08; E21B 10/46; E21B 12/02; E21B 47/065; E21B 10/62; E21B 7/00; B06B 1/0622; B23P 17/00; G10K 11/00; G10K 11/004; G01K 11/24
USPC .......... 175/50, 428, 432, 40; 367/141; 29/428
See application file for complete search history.

(56) References Cited

U.S. PATENT DOCUMENTS 7,036,363 B2    5/2006  Yogeswaren
7,052,215 B2    5/2006  Fukano
(Continued)

OTHER PUBLICATIONS

Appl et al., Measurement of Forces, Temperatures, and Wear of PDC Cutters in Rock Cutting, Nov. 18, 1991 SPE Technical Publication, SPE 24398, 5 pages.
(Continued)

*Primary Examiner* — Daniel P Stephenson
(74) *Attorney, Agent, or Firm* — TraskBritt

(57) ABSTRACT

Components, such as a cutting element for an earth-boring drilling tool, include an ultrasonic transducer coupled therewith and configured to transmit an acoustic signal therethrough, and transmit a data signal to a data acquisition unit in response to receiving a returning echo of the acoustic signal. An earth-boring drilling tool comprises a bit body including a plurality of components, an ultrasonic transducer, and a data acquisition unit operably coupled with the ultrasonic transducer. The data acquisition unit may be configured to receive the data signal and determine a temperature distribution of the component based, at least in part, on a time-of-flight of the acoustic signal and the returning echoes. Methods for forming such components and measuring a temperature of such components may relate to coupling and implementing such an ultrasonic transducer with a component of an earth-boring drilling tool.

20 Claims, 7 Drawing Sheets

(51) Int. Cl.
*G01K 11/24* (2006.01)
*E21B 10/62* (2006.01)
*E21B 7/00* (2006.01)
*G10K 11/00* (2006.01)

(56) References Cited

U.S. PATENT DOCUMENTS

| | | | |
|---|---|---|---|
| 7,497,276 B2 | 3/2009 | Pastusek et al. | |
| 7,604,072 B2 | 10/2009 | Pastusek et al. | |
| 8,807,242 B2 * | 8/2014 | Cheng | 175/50 |
| 2010/0083801 A1 | 4/2010 | Li et al. | |
| 2011/0266058 A1 | 11/2011 | Kumar et al. | |
| 2012/0103688 A1 | 5/2012 | Coman et al. | |
| 2012/0312598 A1 | 12/2012 | Cheng | |
| 2012/0325564 A1 | 12/2012 | Vaughn et al. | |
| 2013/0118807 A1 | 5/2013 | Yang | |

OTHER PUBLICATIONS

IMS, Localization Methods in Ultrasonic Thermometry, Industrial Measurement Systems, Inc., Aurora, Illinois (3 pages) www.imsysinc.com/downloads/04012010%20Localizationtime.pdf viewed on Jun. 24, 2011, 3 pages.

Schmidt et al., Thermal Measurement of Harsh Environments Using Indirect Acoustic Pyrometry, 2007 International Mechanical Engineering Conference and Exposition, Nov. 11-15, 2007, 8 pages.

Yuhas et al., Ultrasonic Measurements of Bore Temperature in Large Caliber Guns, Review of Progress in Quantitative NDE, Jul. 20-25, 2008, Industrial Measurement Systems, Inc., Aurora Illinois, 8 pages.

* cited by examiner

US 9,045,972 B2

APPARATUSES AND METHODS FOR DETERMINING TEMPERATURE DATA OF A COMPONENT OF AN EARTH-BORING DRILLING TOOL

CROSS-REFERENCE TO RELATED APPLICATION

This application is a continuation of U.S. patent application Ser. No. 13/159,164, filed Jun. 13, 2011, now U.S. Pat. No. 8,807,242, issued Aug. 19, 2014, the disclosure of which is hereby incorporated herein in its entirety by this reference.

TECHNICAL FIELD

The present disclosure relates generally to earth-boring drill bits, cutting elements attached thereto, and other tools that may be used to drill or enlarge bore holes in subterranean formations. More particularly, embodiments of the present disclosure relate to obtaining thermal measurements of components of an earth-boring drill bit.

BACKGROUND

The oil and gas industry expends sizable sums to design cutting tools, such as downhole drill bits including roller cone rock bits and fixed-cutter bits. Such drill bits may have relatively long service lives with relatively infrequent failure. In particular, considerable sums are expended to design and manufacture roller cone rock bits and fixed-cutter bits in a manner that minimizes the opportunity for catastrophic drill bit failure during drilling operations. The loss of a roller cone or a polycrystalline diamond compact from a fixed-cutter bit during drilling operations can impede the drilling operations and, at worst, necessitate rather expensive fishing operations.

Diagnostic information (e.g., temperature) related to a drill bit and certain components of the drill bit may be linked to the durability, performance, and the potential failure of the drill bit. For example, thermal measurements of a cutting element has been obtained, at least in a laboratory environment, through the use of one or more embedded thermocouples within the cutting element. The embedded thermocouples may be relatively large and may require careful implementation and placement of partially drilled holes through the substrate and into the diamond table adjacent the cutting surface of a cutting element. The drilled portions through the substrate and diamond table for housing the thermocouples may compromise the mechanical strength of the cutting element. Thermocouples may also require the use of relatively large voltage drivers, which may limit the downhole usefulness in obtaining accurate and representative temperature measurements during actual rock cutting during a subterranean drilling operation or, at the least, in a drilling simulator. As a result of these and other issues, conventional thermal measurements have been limited to laboratory experiments rather than obtaining real-time performance data during rock cutting.

BRIEF DESCRIPTION OF THE DRAWINGS

While the specification concludes with claims particularly pointing out and distinctly claiming what are regarded as embodiments of the present disclosure, various features and advantages of embodiments of the disclosure may be more readily ascertained from the following description of some embodiments of the disclosure when read in conjunction with the accompanying drawings, in which:

DETAILED DESCRIPTION

Figure 1:
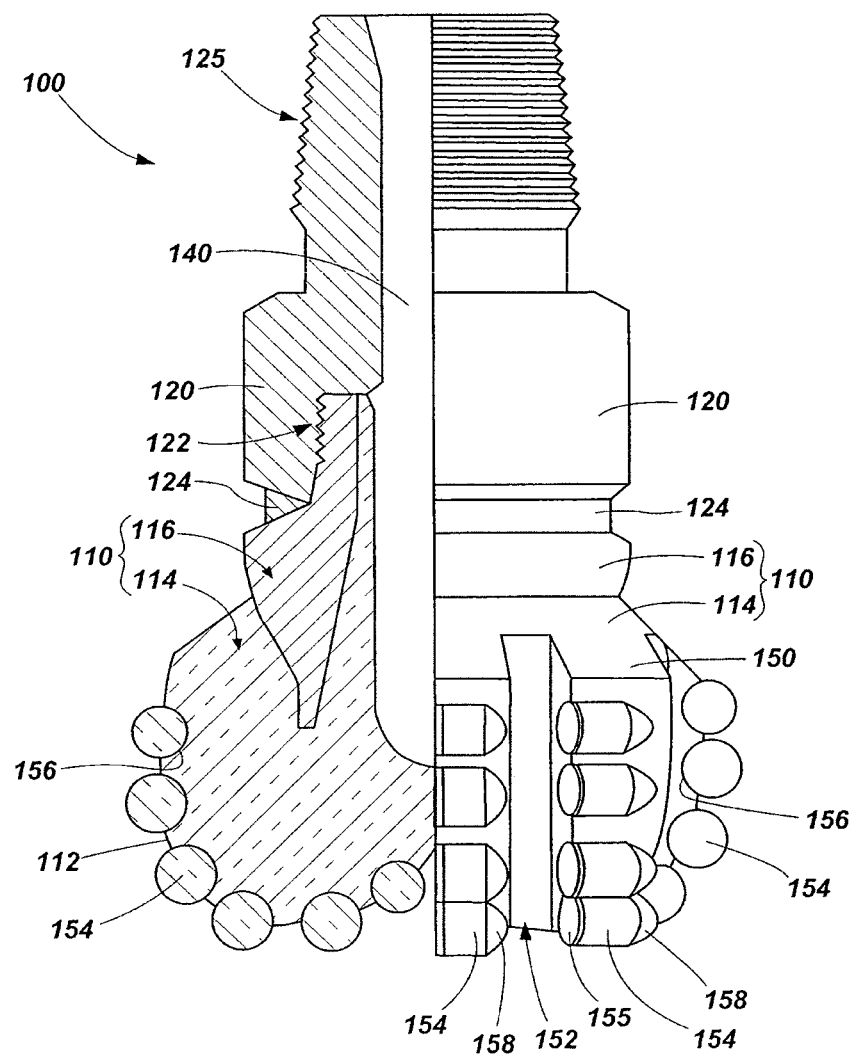
FIG. 1 is a cross-sectional view of an embodiment of an earth-boring drill bit.

In the following detailed description, reference is made to the accompanying drawings that form a part hereof and, in which are shown by way of illustration, specific embodiments in which the invention may be practiced. These embodiments are described in sufficient detail to enable those of ordinary skill in the art to practice the invention, and it is to be understood that other embodiments may be utilized, and that structural, logical, and electrical changes may be made within the scope of the disclosure.

In this description, specific implementations are shown and described only as examples and should not be construed as the only way to implement the present invention unless specified otherwise herein. It will be readily apparent to one of ordinary skill in the art that the various embodiments of the present disclosure may be practiced by other partitioning solutions. For the most part, details concerning timing considerations and the like have been omitted where such details are not necessary to obtain a complete understanding of the present disclosure and are within the abilities of persons of ordinary skill in the relevant art.

Referring in general to the following description and accompanying drawings, various embodiments of the present disclosure are illustrated to show its structure and method of operation. Common elements of the illustrated embodiments may be designated with similar reference numerals. It should be understood that the figures presented are not meant to be illustrative of actual views of any particular portion of the actual structure or method, but are merely idealized representations employed to more clearly and fully depict the present invention defined by the claims below. The illustrated figures may not be drawn to scale.

It should be appreciated and understood that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and that the present invention may be implemented on any number of data signals including a single data signal.

It should be further appreciated and understood that the various illustrative logical blocks, modules, circuits, and algorithm acts described in connection with embodiments disclosed herein may be implemented as electronic hardware, computer software, or combinations of both. To clearly illustrate this interchangeability of hardware and software, various illustrative components, blocks, modules, circuits, and steps are described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the embodiments of the disclosure described herein.

The various illustrative logical blocks, modules, and circuits described in connection with the embodiments disclosed herein may be implemented or performed with a general purpose processor, a special purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

As used herein, a "drill bit" means and includes any type of bit or tool used for drilling during the formation or enlargement of a wellbore in subterranean formations and includes, for example, fixed-cutter bits, rotary drill bits, percussion bits, core bits, eccentric bits, bi-center bits, reamers, mills, drag bits, roller cone bits, hybrid bits and other drilling bits and tools known in the art.

As used herein, the term "polycrystalline material" means and includes any material comprising a plurality of grains or crystals of the material that are bonded directly together by inter-granular bonds. The crystal structures of the individual grains of the material may be randomly oriented in space within the polycrystalline material.

As used herein, the term "polycrystalline compact" means and includes any structure comprising a polycrystalline material formed by a process that involves application of pressure (e.g., compaction) to the precursor material or materials used to Ruin the polycrystalline material.

As used herein, the term "hard material" means and includes any material having a Knoop hardness value of about 3,000 Kgf/mm$^2$ (29,420 MPa) or more. Hard materials include, for example, diamond and cubic boron nitride.

FIG. 1 is a cross-sectional view of an earth-boring drill bit 100, which may be employed in implementing embodiments of the present disclosure. Earth-boring drill bit 100 includes a bit body 110. The bit body 110 of an earth-boring drill bit 100 may be formed from steel. In some embodiments, the bit body 110 may be formed from a particle-matrix composite material. For example, the bit body 110 may further include a crown 114 and a steel blank 116. The steel blank 116 is partially embedded in the crown 114. The crown 114 may include a particle-matrix composite material such as, for example, particles of tungsten carbide embedded in a copper alloy matrix material. The bit body 110 may be secured to a shank 120 by way of a threaded connection 122 and a weld 124 extending around the earth-boring drill bit 100 on an exterior surface thereof along an interface between the bit body 110 and the shank 120. Other methods are contemplated for securing the bit body 110 to the shank 120.

The earth-boring drill bit 100 may include a plurality of cutting elements 154 attached to a face 112 of the bit body 110. Generally, the cutting elements 154 of a fixed-cutter type drill bit have either a disk shape or a substantially cylindrical shape. A cutting element 154 includes a cutting surface 155 located on a substantially circular end surface of the cutting element 154. The cutting surface 155 may be formed by disposing a hard, super-abrasive material, such as mutually bound particles of polycrystalline diamond formed into a "diamond table" under high pressure, high temperature conditions, on a supporting substrate. The diamond table may be formed onto the substrate during the high pressure, high temperature process, or may be bonded to the substrate thereafter. Such cutting elements 154 are often referred to as a polycrystalline compact or a polycrystalline diamond compact (PDC) cutting element 154. The cutting elements 154 may be provided along blades 150, and within pockets 156 formed in the face 112 of the bit body 110, and may be supported from behind by buttresses 158, which may be integrally formed with the crown 114 or the bit body 110. Cutting elements 154 may be fabricated separately from the bit body 110 and secured within the pockets 156 formed in the outer surface of the bit body 110. If the cutting elements 154 are formed separately from the bit body 110, a bonding material (e.g., adhesive, braze alloy, etc.) may be used to secure the cutting elements 154 to the bit body 110.

The bit body 110 may further include junk slots 152 that separate the blades 150. Internal fluid passageways (not shown) extend between the face 112 of the bit body 110 and a longitudinal bore 140, which extends through the shank 120 and partially through the bit body 110. Nozzle inserts (not shown) also may be provided at the face 112 of the bit body 110 within the internal fluid passageways.

The earth-boring drill bit 100 may be secured to the end of a drill string (not shown), which may include tubular pipe and equipment segments (e.g., drill collars, a motor, a steering tool, stabilizers, etc.) coupled end-to-end between the earth-boring drill bit 100 and other drilling equipment at the surface of the formation to be drilled. As one example, the earth-boring drill by 100 may be secured to the drill string with the bit body 110 being secured to the shank 120 having a threaded connection portion 125 and engaging with a threaded connection portion of the drill string. An example of such a threaded connection portion is an American Petroleum Institute (API) threaded connection portion.

During drilling operations, the earth-boring drill bit 100 is positioned at the bottom of a well bore hole such that the cutting elements 154 are adjacent the earth formation to be drilled. Equipment such as a rotary table or a top drive may be used for rotating the drill string and the drill bit 100 within the bore hole. Alternatively, the shank 120 of the earth-boring drill bit 100 may be coupled directly to the drive shaft of a down-hole motor, which may be used to rotate the earth-boring drill bit 100. As the earth-boring drill bit 100 is rotated, drilling fluid is pumped to the face 112 of the bit body 110 through the longitudinal bore 140 and the internal fluid passageways (not shown). Rotation of the earth-boring drill bit 100 causes the cutting elements 154 to scrape across and shear away the surface of the underlying formation. The formation cuttings mix with, and are suspended within, the drilling fluid and pass through the junk slots 152 and the annular space between the well bore hole and the drill string to the surface of the earth formation.

When the cutting elements 154 scrape across and shear away the surface of the underlying formation, a significant amount of heat and mechanical stress may be generated. Components of the earth-boring drill bit 100 (e.g., cutting elements 154) may be configured for detection of performance data during drilling operations, as will be discussed herein with respect to FIGS. 2 through 6. For example, embodiments of the present disclosure may include at least one sensor (e.g., ultrasonic transducer) that may be used to obtain real-time data related to the performance of the cutting element 154, such as thermal data. Diagnostic information related to the actual performance of the earth-boring drill bit 100 may be obtained through analysis of the data signals generated by the sensors. In some embodiments of the present disclosure, one or more cutting elements 154 of the earth-boring drill bit 100 may include an ultrasonic transducer associated therewith that is configured to provide such data. Although cutting elements 154 are illustrated and described herein as examples, embodiments of the present disclosure include other components within the earth-boring drill bit 100 being configured for obtaining diagnostic information related to the actual performance of the earth-boring drill bit 100.

Figure 2:
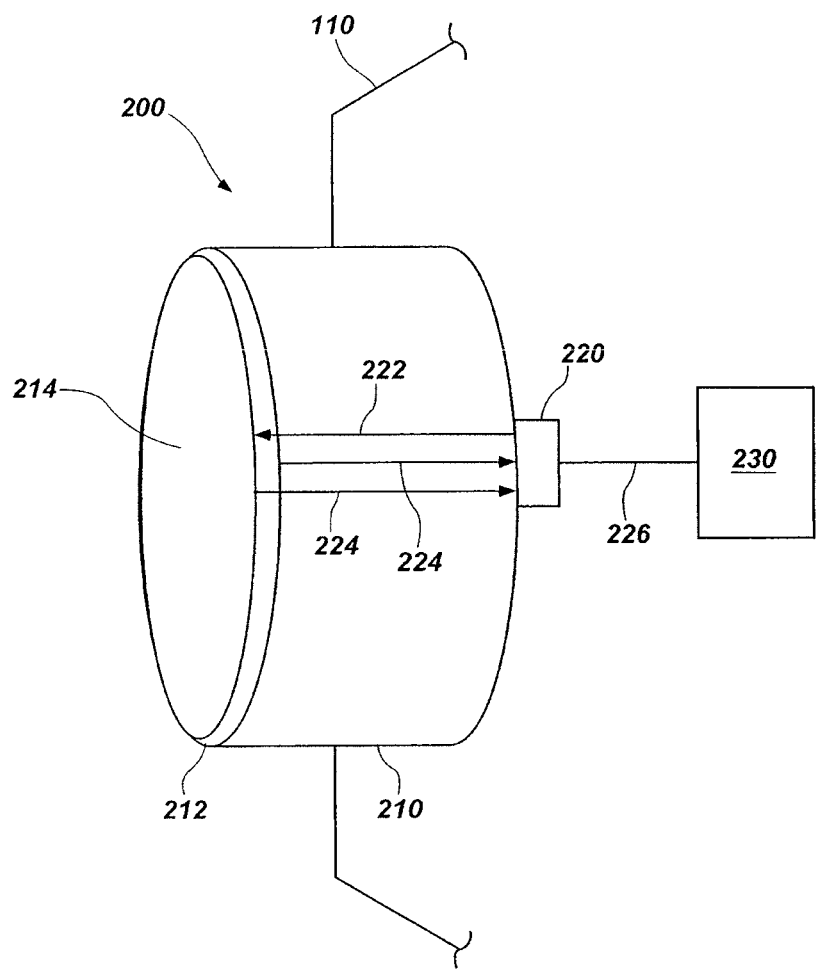
FIG. 2 schematically depicts a cutting element according to an embodiment of the present disclosure.

FIG. 2 is a cutting element 200 according to an embodiment of the present disclosure. The cutting element 200 may be included in an earth-boring drill bit, such as, for example, an earth-boring drill bit similar to the one described in reference to FIG. 1. Referring to FIG. 2, the cutting element 200 may be coupled with the bit body 110 of an earth-boring drill bit. The cutting element 200 may include a cutting element body 210 that may be a single piece or multi-piece substrate supporting a superabrasive "table" having a cutting surface 214 thereon. In other words, the cutting surface 214 may be formed of a superabrasive material, such as mutually bound particles of polycrystalline diamond formed into a diamond table 212. The cutting element 200 may be a PDC cutting element. Conventionally, the diamond table 212 may be formed onto the substrate of the cutting element body 210 during a high pressure, high temperature process, or may formed separately and bonded to the substrate of the cutting element body 210 thereafter. The interface between the diamond table 212 and the cutting element body 210 is shown in FIG. 2 to be substantially planar. It is contemplated that the interface may not be planar, and may include various patterns.

As shown in FIG. 2, the cutting element 200 further includes one or more ultrasonic transducers 220 coupled with the cutting element body 210. In some embodiments, the ultrasonic transducer 220 may directly abut the cutting element body 210 opposite the cutting surface 214. In other words, the ultrasonic transducer 220 may be coupled directly with a back side of the cutting element body 210.

The ultrasonic transducer 220 may be configured to generate acoustic signals 222 (i.e., ultrasonic waves, sound waves, etc.) that are transmitted through the cutting element 200. The acoustic signals 222 may be transmitted as one or more pulses. The ultrasonic transducers 220 may further be configured to receive returning "echoes" 224 of the acoustic signal 222 and generate a voltage in response thereto. The voltage may represent the reception of the returning echoes 224, and may be transmitted as a data signal 226 to a data acquisition unit 230. Non-planar interfaces between the diamond table 212 and the cutting element body 210 may cause some dispersion in the returning echoes 224. Because of the relatively small dimensions of the cutting element 200, the returning echoes 224 traveling at approximately the speed of sound should be detected by the ultrasonic transducer 220 for most non-planar interfaces. Some embodiments may include a focused ultrasonic transducer configured to boost reflected energy of the returning echoes 224. For example, the ultrasonic transducer 220 may be configured to employ phased array ultrasonic and scanning acoustic microscopy techniques to detect ultrasonic signals through a non-planar interface.

The data acquisition unit 230 may further include components such as, for example, an analog-to-digital converter, analysis hardware/software (e.g., processor), and other components for collecting, processing, and/or interpreting the data signals 226 generated by the ultrasonic transducer 220. For example, the ultrasonic transducer 220 may be interfaced with a processing module of the data acquisition unit 230, which is located within the drill bit itself. For example, some earth-boring drill bits that include such an internal processing module may be termed a "Data Bit" module-equipped drill bit. Such a Data Bit may include electronics for obtaining and processing data related to the drill bit, the drill bit frame, and operation of the drill bit, such as is described in U.S. Pat. No. 7,604,072, which issued Oct. 20, 2009 and is entitled Method and Apparatus for Collecting Drill Bit Performance Data, the entire disclosure of which is incorporated herein by this reference. In other words, the ultrasonic transducer 220 may be part of a thermal measurement system that is configured for acoustic pyrometry, and for providing temperature measurements during the rock cutting process (e.g., drilling operation). As a result of employing the ultrasonic transducer 220, the response time for obtaining thermal measurements may be reduced to approximately the speed of sound.

The data acquisition unit 230 may include components located outside of the earth-boring drill bit, such as external computers and displays that may further collect, process, interpret, and display the data signals 226. Transmission of the data signals 226 between the ultrasonic transducer 220 and the various components of the data acquisition unit 230 may include wired or wireless communication, or a combination thereof. If the data acquisition unit 230 is located outside of the earth-boring drill bit, one suitable location may be in a so-called "sub" immediately above the drill bit in the drill string.

During a drilling operation, the earth-boring drill bit may be rotated within a subterranean formation under applied axial force, conventionally termed weight on bit (WOB), with the cutting surface 214 of the cutting element 200 scraping across and shearing away the surface of the underlying formation. When the cutting element 200 scrapes across and shears away the surface of the underlying formation, a significant amount of frictional heat and mechanical impact stress may be generated, and the temperature of the cutting element body 210 may increase as a result.

During the drilling operation, the ultrasonic transducer 220 may be caused to transmit the acoustic signals 222 periodically into the cutting element body 210. As the acoustic signals 222 propagate through the cutting element body 210, because the propagation speed of the acoustic signals 222 is a function of the temperature of the cutting element body 210, the time-of-flight for the acoustic signals 222 and the returning echoes 224 may be characterized as a function of the temperature distribution of the cutting element 200. Therefore, by measuring the transit time of the acoustic signals 222 and the corresponding returning echoes 224 across the cutting element body 210, the temperature distribution in the cutting element body 210 can be obtained using an inverse calculation method. As shown in FIG. 2, a plurality of returning echoes 224 may be received by the ultrasonic transducer 220. For example, reflections of the acoustic signals 222 may occur at the interface between the cutting element body 210 and the diamond table 212. Additional reflections may occur at the cutting surface 214. Reflections may occur at other locations within the cutting element 200, such as, for example, due to material impurities, gaps, small cracks, etc., in the cutting element 200. The data acquisition unit 230 may be configured to distinguish between the plurality of different returning echoes 224. For example, the ultrasonic transducer 220 may be time-gated to receive the returning echoes 224 during a time window that is likely to have the desired returning echoes 224 to be analyzed. In some embodiments, the data acquisition unit 230 may be configured through its processing to disregard information received from the data signal 226 that corresponds to returning echoes 224 outside of a desired time window.

By measuring the time-of-flight of the acoustic signals 222 and the returning echoes 224, the temperature distribution of the cutting element 200 may be calculated, which may also be used to infer the heat flux at the cutting surface 214 of the cutting element 200 (i.e., at the interface between the cutting element and the formation). The heat flux is an amount of heat energy transferred into an object per unit of time.

The temperature distribution of the earth-boring drill bit 100 (FIG. 1), the cutting element 200 (FIG. 2), or another component of the earth-boring drill bit 100 may be combined with other down-hole measurements (e.g., vibration, stress, etc.), the knowledge of which may be used to improve drilling performance, reduce drill bit dynamics dysfunction, and diagnose problems before drill bit failure occurs.

Figure 3:
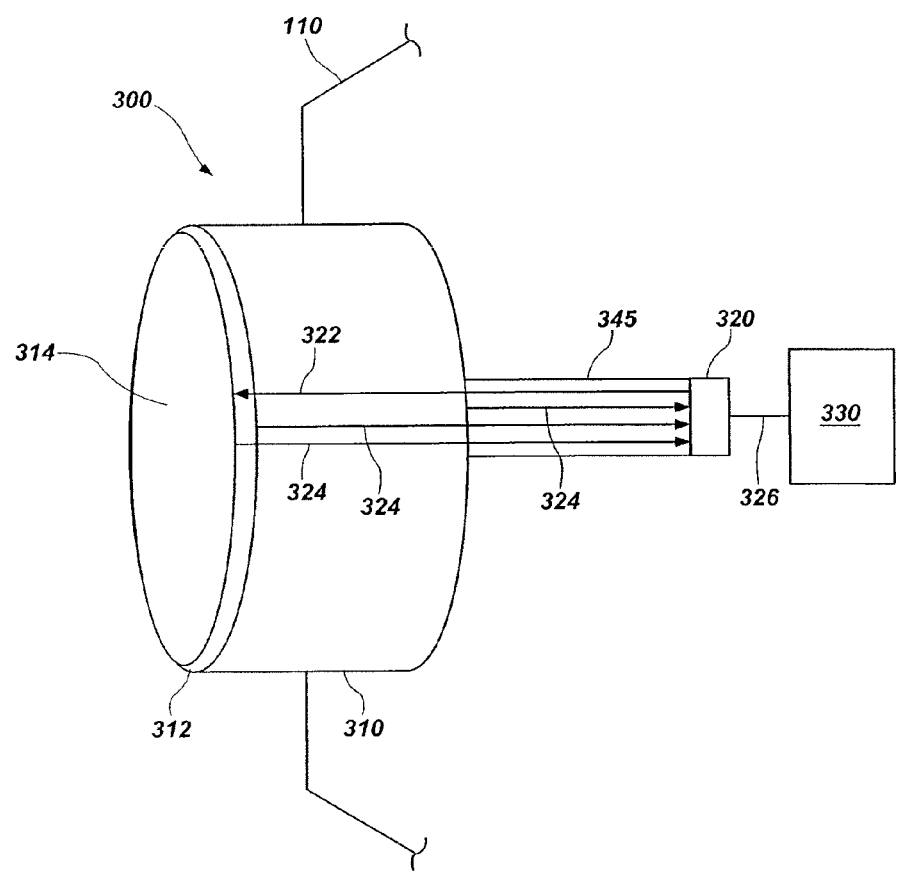
FIG. 3 schematically depicts a cutting element according to another embodiment of the present disclosure.

FIG. 3 is a cutting element 300 according to another embodiment of the present disclosure. The cutting element 300 may be coupled with the bit body 110 of an earth-boring drill bit. The cutting element 300 includes a cutting element body 310 that may include a single or multi-piece substrate supporting a superabrasive "table" having a cutting surface 314 thereon. The cutting element 300 may be a PDC cutting element that includes a diamond table 312. The cutting element 300 further includes one or more ultrasonic transducers 320 coupled with the cutting element body 310. The ultrasonic transducer or transducers 320 may be coupled to the cutting element body 310 through a waveguide 345. The ultrasonic transducer 320 may be configured to periodically generate acoustic signals 322 (i.e., ultrasonic waves, sound waves, etc.) that are transmitted through the cutting element 300. The acoustic signals 322 may be transmitted as one or more pulses. The ultrasonic transducers 320 may further be configured to receive returning echoes 324 of the acoustic signal 322 and generate a voltage in response thereto, which may be transmitted as a data signal 326 to a data acquisition unit 330.

The ultrasonic transducer 320 may be remotely located from the cutting element body 310, such as being proximate the internal electronics module of a Data Bit module-equipped drill bit. To implement such an arrangement, a waveguide 345 may be coupled between the ultrasonic transducer 320 and the cutting element body 310. The waveguide 345 may be formed from a substantially different material than the crown of the drill bit that may assist in keeping the acoustic signals 322 within the waveguide 345. For example, as the drill bit may be formed of a particle-matrix material, while the waveguide 345 may be formed from materials such as a metal, a ceramic, or a plastic, as non-limiting examples. The waveguide 345 may further be at least substantially solid, for example, a steel rod that is coupled within the crown of the drill bit to facilitate transmission of the acoustic signals 322 between the ultrasonic transducer 320 and the cutting element body 310. In some embodiments, the waveguide 345 may comprise a plurality of layers, such as a plurality of concentric thin tubes. In some embodiments, the waveguide 340 waveguide 345 may comprise a coiled foil.

The waveguide 345 may be formed within the crown of the drill bit, such as being embedded, welded, adhered, or otherwise attached with the crown of the drill bit at various stages during the formation of the drill bit. In some embodiments, the waveguide 345 may be surrounded by a tube. The tube (e.g., metal tube) may be set in place of the waveguide 345 prior to formation (e.g., sintering) of the particle-matrix material of the bit body. For example, the tube may be set in place from the back of the cutting element body 310 to the shank where the ultrasonic transducer 320 may ultimately be located. After formation of the bit body around the tube, the waveguide 345 may be inserted into the tube. During formation of the bit body, the tube may provide a location for installation of the waveguide 345. After formation of the bit body, the tube may provide support and protection of the waveguide 345.

Figure 4:
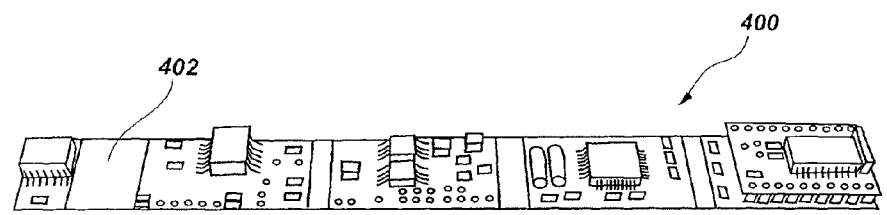
FIG. 4 is a perspective view of an electronics module that may be coupled with at least one ultrasonic transducer, according to an embodiment of the present disclosure.

FIG. 4 is an internal electronics module 400 that may be coupled with at least one ultrasonic transducer 220, 320 (FIGS. 2 and 3). In some embodiments, the at least one ultrasonic transducer 220, 320 may be mounted on a circuit board 402. In some embodiments, the at least one ultrasonic transducer 220, 320 may be physically separate from the circuit board 402, but still operably coupled therewith, such that the at least one ultrasonic transducer 220, 320 communicates with the components on the circuit board 402. Although the circuit board 402 is shown in FIG. 4 in a flat, uncurled configuration, the circuit board 402 may be configured as a flexible circuit board that may be flexible and bend into different configurations. As a result, the circuit board 402 may enable the positioning of the electronics module 400 at various locations within an earth-boring drill bit. For example, the circuit board 402 may be formed as a ring suitable for disposition about an end cap and into a central bore of the shank of an earth-boring drill bit in an arrangement used for Data Bit modules.

Figure 5A:
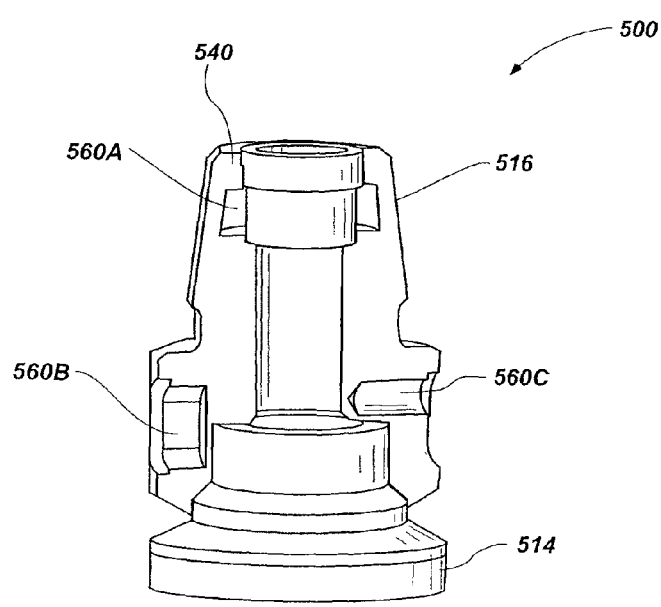
FIGS. 5A through 5E are various perspective views of a drill bit illustrating non-limiting examples of locations in the drill bit where an electronics module, an ultrasonic transducer, or both, may be located.

FIGS. 5A through 5E are various perspective views of a drill bit 500 illustrating non-limiting examples of locations in the drill bit 500 where an electronics module (e.g., the electronics module 400 of FIG. 4), an ultrasonic transducer (e.g., the ultrasonic transducer 220, 320 of FIGS. 2 and 3), or both may be located. For example, FIG. 5A illustrates a shank 516 coupled with a crown 514 of a bit body. In addition, the shank 516 includes an annular race 560A formed in the wall of a longitudinal bore 540. The presence of the annular race 560A may allow expansion of the electronics module into the annular race 560A as an end cap is disposed into position to form a sealed annular cavity. FIG. 5A shows additional contemplated locations for the electronics module, the ultrasonic transducer, or both. For example, cut-out portions 560B, 560C (e.g., oval, round, etc.) may be located in a depression in a side of the shank 516 of the drill bit 500 (such depression may also be referred to as a torque or "breaker" slot. The cut-out portions 560B, 560C may be configured to accept the electronics module, the ultrasonic transducer, or both. If the cut-out portions 560B, 560C are used to house the ultrasonic transducer or the electronics module, the cut-out portions 560B, 560C may be capped and sealed for protection of the components.

Figure 5B:
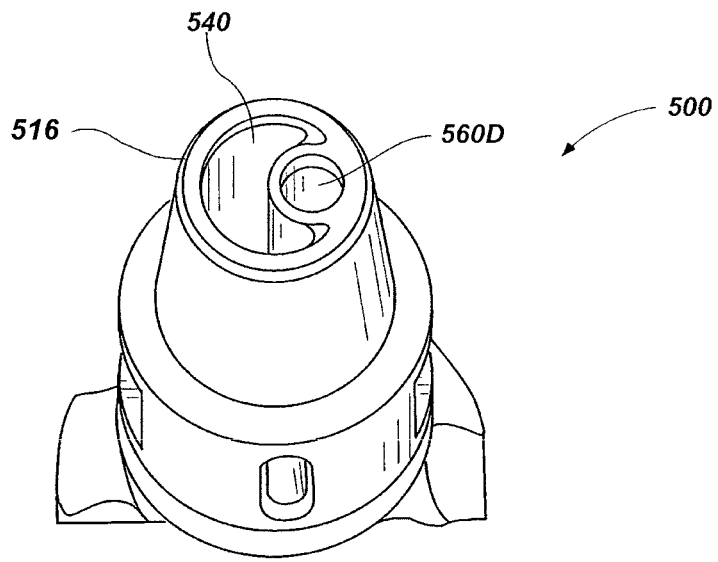

FIG. 5B illustrates another configuration of the shank 516 that includes a circular depression 560D, with the longitudinal bore 540 formed around the circular depression 560D. The longitudinal bore 540 is configured to allow transmission of drilling fluids during a drilling operation. The circular depression 560D may house the ultrasonic transducer, the electronics module, or both, and may be capped and sealed for protection of the components.

Figure 5C:
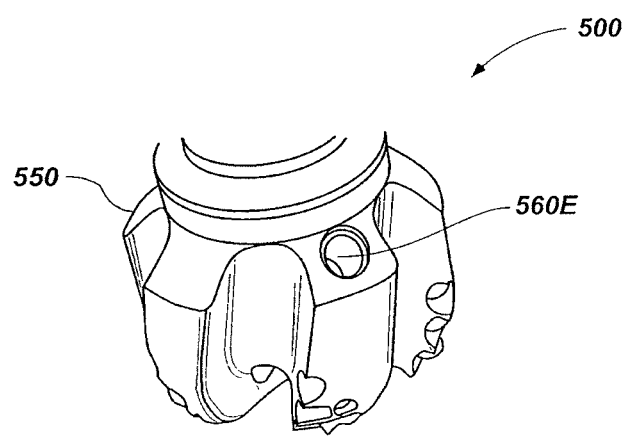
Figure 5D:
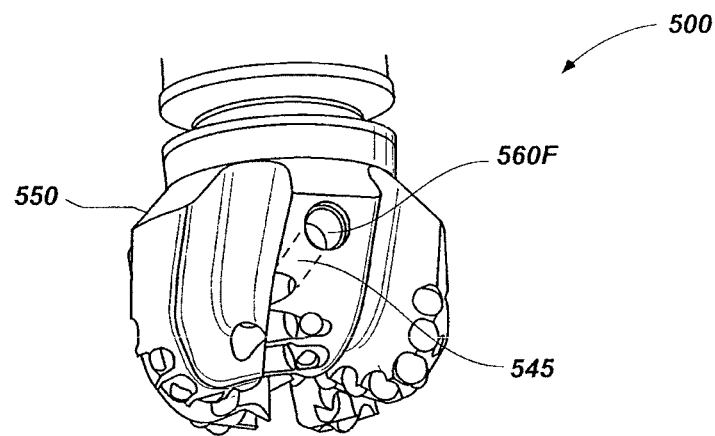
Figure 5E:
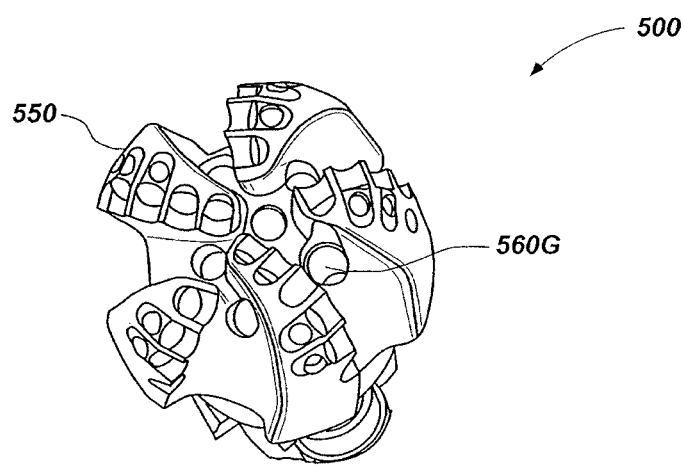

FIGS. 5C, 5D, and 5E illustrate circular depressions 560E, 560F, and 560G, respectively, formed in locations on the drill bit 500, such as in or near blades 550 of the drill bit. The locations for the circular depressions 560E, 560F, 560G may offer a reasonable amount of room for the ultrasonic transducer or electronics module while still maintaining acceptable structural strength in the blades 550.

Referring specifically to FIG. 5D, a waveguide 545 may be coupled within the drill bit 500 to couple between the location (e.g., circular depression 560F) of the ultrasonic transducer and a cutting element. In some embodiments, each blade 550 of the drill bit 500 may be configured to house an ultrasonic transducer and a waveguide 545 that couples with at least one cutting element thereon. The waveguide 545 is shown as dashed lines in FIG. 5D for convenience, and is not intended to be limited to such a path. Each of the other embodiments of FIGS. 5A, 5B, 5C, and 5E may include waveguides embedded within the drill bit to couple between the ultrasonic transducer and at least one cutting element.

Referring collectively to FIGS. 5A-5E, one or more ultrasonic transducers and/or the electronics module may be located at one of these locations 560A-560G within the drill bit 500, or combinations thereof. Of course, other locations may be selected for the ultrasonic transducer and the associated electronics module.

Figure 6:
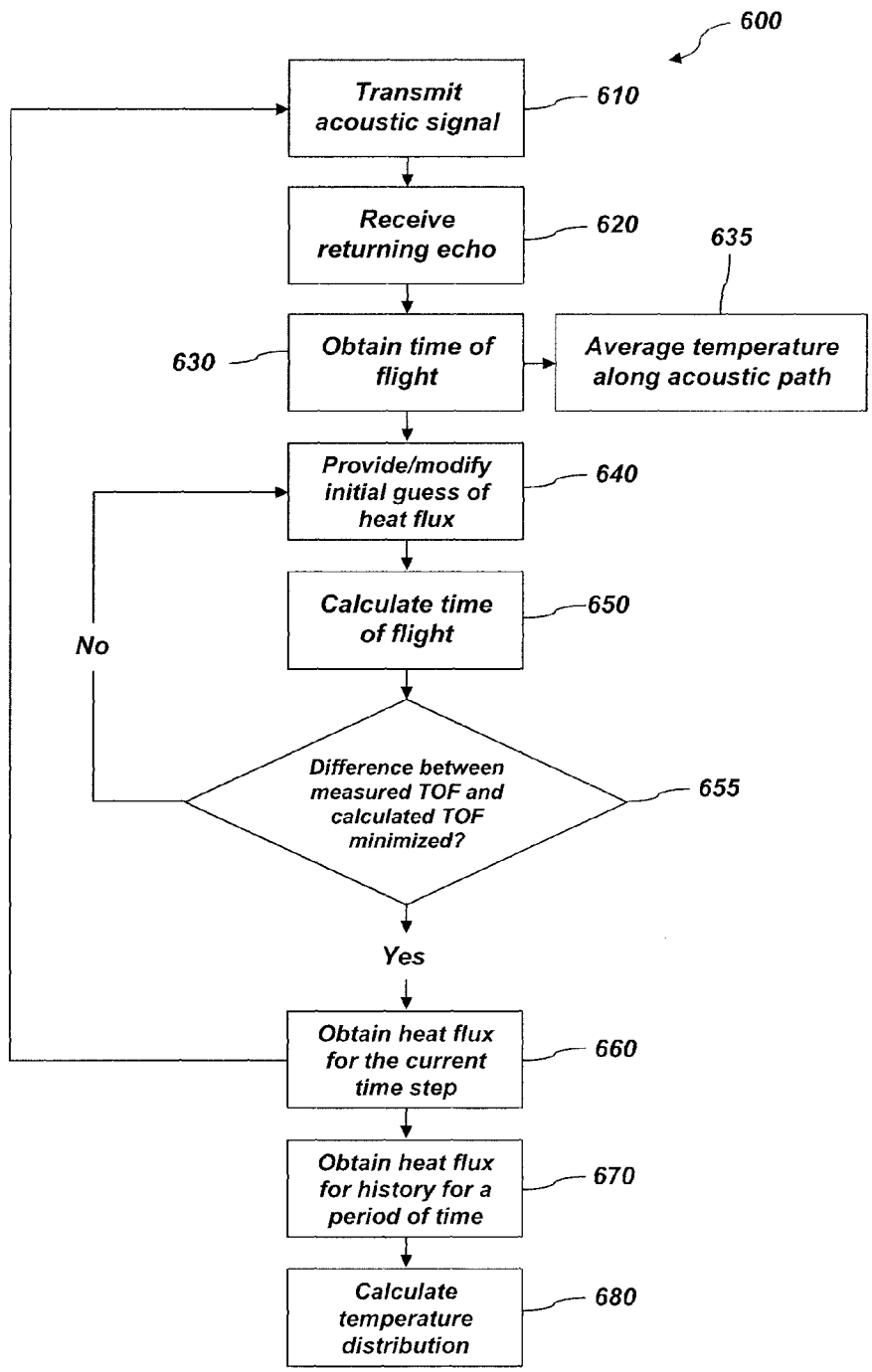
FIG. 6 is a flowchart of a method for measuring a temperature of a component of an earth-boring drilling tool.

FIG. 6 is a flowchart 600 of a method for measuring a temperature of a component of an earth-boring drilling tool. At operation 610, at least one acoustic signal may be transmitted through a component of an earth-boring drill bit. The at least one acoustic signal may be generated by an ultrasonic transducer. The component of the earth-boring drill bit may be a cutting element. The at least one acoustic signal may be transmitted through a waveguide to travel to and from the cutting element. At operation 620, at least one returning echo of the at least one acoustic signal may be received by the ultrasonic transducer through the earth-boring drill bit. At operation 630, the time of flight of the acoustic signal may be obtained based on the time of receiving the returning echo (i.e., operation 620) after transmission of the acoustic signal (i.e., operation 610). With the measured time of flight information, the average temperature of the component may be determined at operation 635. The average temperature may be calculated using the known dimensions and materials of the component.

The measured time of flight information may also be used to determine the heat flux experienced by the component, as well as a temperature distribution of the component. At operation 640, an initial guess of the heat flux may be provided. While the actual heat flux may be an unknown amount of heat energy transferred into an object per unit of time, the heat flux may be assumed to be a substantially constant value because of the relatively short dimensions of the component compared with the speed of sound. In addition, while the term "guess" is used herein, the guess may be an educated estimate of what the heat flux may be based on historical data and experimental data. With the initial guess of the heat flux, a calculated time of flight may be determined at operation 650. At operation 655, the calculated time of flight (TOF) information is compared with the measured time of flight (TOF) information. The measured time of flight information is the actual time of flight obtained during operation 630, which is based on the time of receiving the returning echo after transmission of the acoustic signal. The calculated time of flight information may be obtained during operation 650, which may be based on using the initial guess of the heat flux, as well as calibrated values provided for the speed of the acoustic signals for a given material at different temperatures.

If there is a substantial difference (according to desired error tolerances) between the measured and calculated time of flight information, operations 640 and 650 may be repeated. For example, the guess of the heat flux modified (i.e., operation 640), and a new time of flight calculated (i.e., operation 650) based on the modified guess of the heat flux. In other words, the initial guess of the heat flux is an initial boundary condition in calculating the time of flight, and the heat flux may be modified to be another boundary condition to calculate a new calculated time of flight information. Operations 640, 650, and 655 may be iterated until the difference between the calculated time of flight information and the measured time of flight information is minimized to a desired level of error tolerance. In other words, the iterations may result in the modified guess of the heat flux converging to approximately the actual heat flux experienced by the component. At operation 660, the heat flux from the modified guess of the heat flux is considered the heat flux for the current time step. Operation 610 may be repeated to determine a new measured time of flight information to determine a heat flux calculation for the next time step later in time. If there is a difference between the calculated time of flight information and the measured time of flight information, the heat flux boundary condition may be adjusted, and iterations may occur until the difference is sufficiently small, in order to obtain accurate heat flux values and a corresponding temperature distribution of the component.

Based on the historical data of the time of flight data, and the corresponding heat flux over a period of time, a temperature distribution of the distribution of the component may be determined. At operation 670, the historical data may be obtained and recorded. Based on the historical data, the temperature distribution of the component may be calculated at operation 680, for example, by a data acquisition unit configured to provide such analysis.

Other methods of determining a temperature distribution, or the heat flux of an object are described in Schmidt et al., *Thermal Measurement of Harsh Environments Using Indirect Acoustic Pyrometry*, 2007, International Mechanical Engineering Conference and Exposition, the entire disclosure of which is incorporated herein by this reference.

Although the foregoing description contains many specifics, these are not to be construed as limiting the scope of the present invention, but merely as providing certain exemplary embodiments. Similarly, other embodiments of the disclosure may be devised that do not depart from the scope of the present invention. For example, features described herein with reference to one embodiment also may be provided in others of the embodiments described herein. The scope of the invention is, therefore, indicated and limited only by the appended claims and their legal equivalents, rather than by the foregoing description. All additions, deletions, and modifications to the invention, as disclosed herein, which fall within the meaning and scope of the claims, are encompassed by the present invention.

CONCLUSION

In one embodiment, a cutting element of an earth-boring drilling tool is disclosed. The cutting element includes a cutting element body having a cutting surface thereon, and an ultrasonic transducer coupled with the cutting element body. The ultrasonic transducer is configured to transmit an acoustic signal through the cutting element body and transmit a data signal to a data acquisition unit in response to receiving a returning echo of the acoustic signal.

Another embodiment comprises a method for forming an element for an earth-boring drilling tool. The method includes forming a cutting element having a cutting element body and a cutting surface, and coupling an ultrasonic transducer with the cutting element body opposite the cutting surface.

Another embodiment comprises a method for measuring a temperature of a component of an earth-boring drilling tool. The method includes transmitting at least one acoustic signal through a component of an earth-boring drill bit, receiving at least one returning echo of the at least one acoustic signal through the component, and determining a temperature distribution of the component based, at least in part, on a time-of-flight of the at least one acoustic signal and the at least one returning echo.

Yet another embodiment comprises an earth-boring drilling tool. The earth-boring drilling tool includes a bit body including a plurality of components, an ultrasonic transducer, and a data acquisition unit. The data acquisition unit is operably coupled with the ultrasonic transducer. The ultrasonic transducer is configured to generate and transmit acoustic signals through a component of the plurality and generate a data signal in response to receiving returning echoes of the acoustic signals. The data acquisition unit is configured to receive the data signal and determine a temperature distribution of the component based, at least in part, on a time-of-flight of the acoustic signals and the returning echoes.

What is claimed is:

1. An earth-boring drilling tool, comprising:
a thermal measurement system configured to determine a temperature characteristic associated with a component of the drilling tool during a subterranean drilling operation, the thermal measurement system including:
an ultrasonic transducer coupled with the component, the ultrasonic transducer configured to transmit an acoustic signal into the component and generate a data signal responsive to receiving a returning echo of the acoustic signal; and
a processor operably coupled with the ultrasonic transducer, the processor configured to determine the temperature characteristic associated with the component, based at least in part, on time-of-flight information of the acoustic signal and the returning echo.

2. The earth-boring drilling tool of claim 1, wherein the component of the drilling tool comprises a cutting element.

3. The earth-boring drilling tool of claim 1, wherein the temperature characteristic associated with the component includes a temperature distribution of the component.

4. The earth-boring drilling tool of claim 1, wherein the temperature characteristic associated with the component includes an average temperature of the component.

5. The earth-boring drilling tool of claim 1, wherein the temperature characteristic associated with the component includes a heat flux experienced by the component.

6. The earth-boring drilling tool of claim 1, wherein the ultrasonic transducer is time-gated.

7. The earth-boring drilling tool of claim 1, further comprising a waveguide disposed within a portion of the drilling tool between the ultrasonic transducer and the component, wherein the waveguide couples the ultrasonic transducer and the component.

8. The earth-boring drilling tool of claim 7, wherein the waveguide is formed from a material that is substantially different than another material surrounding the waveguide.

9. A method for forming a component for an earth-boring drilling tool, the method comprising:
securing a component for a drilling tool to a body of the drilling tool;
coupling an ultrasonic transducer with the component; and
coupling a processor with the ultrasonic transducer, the processor configured to generate a temperature characteristic of the component during a drilling operation based, at least in part, on a time-of-flight measurement between an acoustic signal transmitted into the component and a return echo signal received by the ultrasonic transducer.

10. The method of claim 9, further comprising forming a waveguide in the drilling tool between the ultrasonic transducer and the component to couple the ultrasonic transducer and the component.

11. The cutting element of claim 10, wherein forming the waveguide includes forming the waveguide from a material including at least one of a metal, a ceramic, and a plastic material.

12. The cutting element of claim 10, wherein forming the waveguide includes forming the waveguide as one of a rod, a coiled foil, and a plurality of concentric tubes.

13. A method for measuring a temperature of a component of an earth-boring drilling tool, the method comprising:
transmitting an acoustic signal from an ultrasonic transducer into a component of an earth-boring drilling tool;
receiving a returning echo of the acoustic signal by the ultrasonic transducer; and
determining a temperature characteristic of the component based, at least in part, on a measured time-of-flight of the acoustic signal and the returning echo during a drilling operation.

14. The method of claim 13, wherein determining a temperature characteristic of the component includes determining a heat flux of the component during the drilling operation.

15. The method of claim 14, wherein determining a temperature characteristic of the component includes determining the heat flux at a cutting surface of a cutting element of the earth-boring drilling tool at an interface with a subterranean formation.

16. The method of claim 14, wherein determining a heat flux of the component includes:
generating an estimate of the heat flux;
generating an estimated time-of-flight of the acoustic signal and the returning echo based, at least in part, on the estimate of the heat flux;
comparing the measured time-of-flight with the estimated time-of-flight;
modifying the estimate of the heat flux and the estimated time-of-flight until a difference between the measured time-of-flight with the estimated time-of-flight is within a tolerance range; and
determining the heat flux to be the estimate of the heat flux when the difference between the measured time-of-flight with the estimated time-of-flight is within the tolerance range.

17. The method of claim 13, wherein determining a temperature characteristic includes determining an average temperature of the component.

18. The method of claim 13, wherein determining a temperature characteristic includes determining a temperature distribution of the component.

19. The method of claim 13, wherein transmitting an acoustic signal includes transmitting the acoustic signal from the ultrasonic transducer that is remote from the component.

20. The method of claim 19, wherein transmitting the acoustic signal from the ultrasonic transducer that is remote from the component includes transmitting the acoustic signal through a waveguide disposed in the drilling tool between the ultrasonic transducer and the component.

* * * * *